Aug. 6, 1935.  J. WHITE  2,010,575
BUNG DRIVER
Filed April 13, 1934
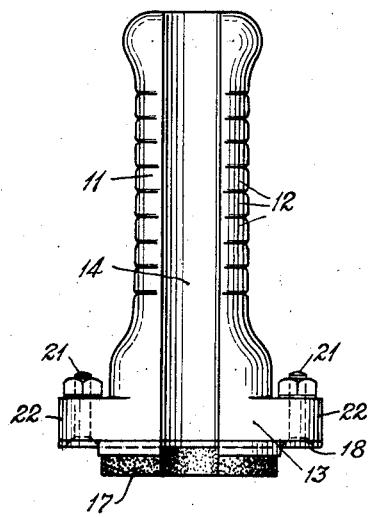
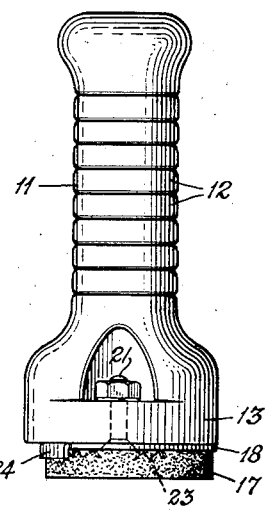
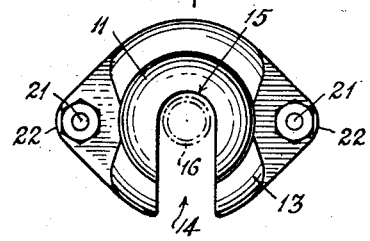
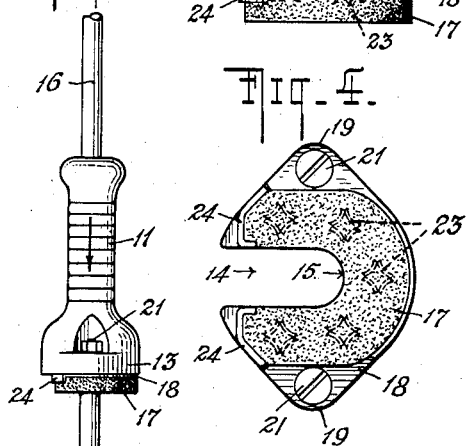
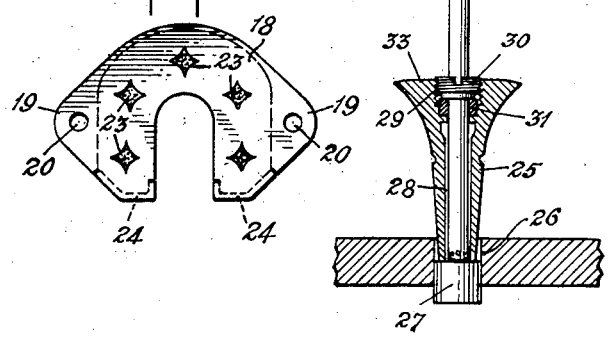
INVENTOR
JOSEPH WHITE
BY
ATTORNEY Patented Aug. 6, 1935

2,010,575

UNITED STATES PATENT OFFICE 2,010,575

BUNG DRIVER

Joseph White, New York, N. Y.

Application April 13, 1934, Serial No. 720,445

2 Claims. (Cl. 225—4)

This invention relates to appliances for tapping beer kegs, and more particularly to the bung driver which is conventionally used manually to administer a smart hammer blow to a tapering bushing that is adapted to drive the bung from the bung-hole into the keg and simultaneously to seat the tapered bushing firmly in the bung-hole.

Such a bushing has a longitudinal bore to receive telescopically the pipe used for drawing off the beer, and this bore has a threaded mouth to receive a metal screw plug or gland that confines a rubber gasket surrounding the pipe within the bore and forms therewith a fluid-tight joint when the gland is screwed into the bushing.

In the operation of tapping the keg, the pipe is first inserted into the bushing and the gland screwed home, and the bushing, with its enclosed pipe, is placed against the bung, after which the bung driver, or hammer, which is usually of a shape somewhat resembling a dumb-bell, with an open-sided longitudinal bore, is slipped upon the pipe, and is brought smartly down against the head of the bushing one or more times, to drive out the bung and seat the bushing and pipe in the bung-hole.

The gland is then unscrewed slightly to relax the sealing pressure on the pipe, so that the latter can be thrust down into the fluid contents of the keg, to a region near the opposite wall thereof. The gland is then screwed home tightly to complete the seal between pipe and bushing.

The various steps in this operation must, obviously, be performed quickly, or the gaseous content of the beer, and often the beer itself, will blow through the bushing past the relaxed gland, and escape, wasting the beer, or at least lowering its desirable drawing pressure and leaving it flat and unpalatable.

The bushing and gland are usually made of brass, and in practice, it is found frequently that the hammer-blows administered by the heavy metal bung driver against the metal head of the bushing, around the threaded seat of the gland, tend to impact the metal of the bushing and deform the threads of the gland seat. This effect is aggravated when, as often occurs, an unskilled or careless operative permits the metal gland to project somewhat above the head of the bushing, so that the metal base of the bung driver hammers directly upon the relatively small gland, upsetting the brass and making it almost impossible to screw it into place at times; and in any event so delaying the operation as to cause the above described loss of gas and fluid.

The primary object of the present invention is to obviate this loss of product and destruction of parts, by eliminating the above described deformation of the threaded gland and its seat, and a particular object is to provide a bung driver of improved form by which the necessary hammer-blows will be delivered with a cushioned effect.

The above, and other features of the invention are illustrated and described fully in the accompanying drawing and specification, and are pointed out in the claims.

In the drawing,

Fig. 1 is a view in front elevation of a bung driver or hammer in the construction of which the invention has been embodied;

Fig. 2 is a view thereof in side elevation;

Fig. 3 is a plan view of the same;

Fig. 4 is a bottom plan view;

Fig. 5 is a detail view in plan of the cushion plate, taken separately;

Fig. 6 is a schematic view, illustrating the device of the preceding figures as used in the operation of tapping a keg, part of the keg-wall, bung-hole, tap-bushing, and tap-pipe being also shown.

In a now-preferred form of the invention selected for illustration and description, the part designated generally by the reference character 11 is a bung driver or hammer device of the conventional sort used in tapping beer kegs, comprising an elongated metal member having somewhat the shape of a dumb-bell with a serrated hand-grip portion 12, and having a relatively large foot-portion 13 adapted to serve as the hammer, the body of the device having an open slot 14 running from end to end, and extending back to the axial line of the device which serves as a longitudinal bore 15 to receive the tap-pipe 16, which is of the form usually employed for insertion in a beer keg to draw off the contents thereof.

In pursuance of the invention, I have provided the hammer with a novel cushioning part 17, which is formed of material having a suitable resilient characteristic, as for example a rubber compound vulcanized to a degree of hardness somewhat greater than that of the rubber heel of a shoe, which it resembles in general shape, having, however, a slot corresponding in shape to the slot 14 and communicating central bore 15 of the body of the hammer device.

As an illustrative and now-preferred form of means for attaching the cushion 17 to the hammer-head 13, I have shown a metal plate 18 upon which the rubber cushion is vulcanized before attachment to the hammer-head, the plate having lugs 19 with holes 20 to receive bolts 21 passing through similar lugs 22 on the hammer head.

A firmer union between the cushion 17 and its supporting plate 18 may be secured by stamping up projections 23 in the plate, at spaced intervals, and vulcanizing the rubber thereon. I prefer also to provide an abutment for the forward margin of the cushion by bending up the plate as shown at 24. This serves the double purpose of holding the cushion against lateral spreading at its two weakest regions and of protecting its forward edges against destructive contacts when the bung driver is being slipped upon the pipe 16.

In Fig. 6 I have illustrated the conventional mode of using such a bung driver in combination with the usual tap-pipe 16 and tap-bushing 25, it being understood that these are merely illustrative forms of such key-tapping appliances.

The reference character 26 designates the bung-hole of a beer keg, and 27 is the bung which is to be driven into the keg and replaced by the tap-bushing 25, which is shown as of conventional form, having a tapered exterior, and a longitudinal bore 28 to receive the tap-pipe 16.

In a threaded enlargement 29 of this bore, near its mouth, is fitted a screw-gland 30 of annular form, surrounding the pipe 16, and confining a gasket 31 of elastic material which affords a fluid-tight seal between the pipe 16 and bushing 25 when the gland 30 is screwed home.

Fig. 6 shows the several members clearly in their relative positions ready to tap the keg. To bring the parts to this position, the pipe 16 has been thrust into the bushing 25, first unscrewing the gland 30 somewhat to relax the gasket 31, and then the gland has been screwed home firmly into the position illustrated; and the bushing 25, with its pipe 16, thus assembled, has been placed against the bung 27, and the bung driver or hammer 11 is slipped sidewise on the pipe 16, occupying the raised, or full line position shown in Fig. 6.

When the hammer 11 is now brought down smartly one or more times against the head 33 of the bushing 25 in the known manner, it delivers a blow which is cushioned by the cushion 17 sufficiently to avoid the harsh swaging action which has heretofore resulted from the impact of a metal hammer upon a brass bushing and gland; but the blow is adequate to give the bushing the jolt necessary to start the bung 27, drive the latter into the keg, and seat the bushing 25 firmly in the bung-hole 26.

In practice, it has been found that the operative finds that he can strike a harder blow with this improved cushioned hammer, in the confidence that such a blow will not deform the threaded gland seat, and so the tapping operation can be effected quickly, with no loss of beer, or of pressure, and consequently with full maintenance of the gas content at a desirable drawing pressure, and a complete elimination of this prevalent cause of flatness in the beer.

The life of the gland, and therefore of the bushing, is increased by this preservation of the threaded gland-joint, and the expense of maintenance is thus cut down to normal wear and tear. It is always possible, with clean, normal threads, to unscrew the gland easily and screw it home completely, so that it does not project beyond the head 33 of the bushing, and this aids to keep the gland out of the way of the hammer, obviating a prolific source of deforming contacts.

The cushion likewise protects the hammer head against deformation, increasing its life, and can itself be replaced quickly when worn out, at an expense which is small relatively to the savings effected, by its use, including economy of time in the tapping operation; saving of beer and its maintenance in palatable condition under adequate drawing pressure; and reduction of the maintenance costs and replacements of the bushing and hammer parts.

I claim:

1. A bung-driver or hammer device of the type comprising an elongated body affording a hand-grip, and having one end enlarged to form a hammer-head, said body and head being formed with an axial bore, and with a co-extensive open slot from end to end to permit emplacement of said hammer laterally upon a pipe; said device having a resilient cushion supported by a metal plate secured removably to the hammer-head and having a slot registering with that of the slot and bore of said handle body and further characterized by having said cushion-supporting plate provided with spaced central projections embedded in the body of the cushion, and with marginal abutment projections adjacent to the slotted end of said cushion.

2. A bung-driver or hammer device of the type comprising an elongated body affording a hand-grip, and having one end enlarged to form a hammer-head, said body and head being formed with an axial bore, and with a co-extensive open slot from end to end to permit emplacement of said hammer laterally upon a pipe; said device having a resilient cushion supported by a metal plate secured removably to the hammer-head and having a slot registering with that of the slot and bore of said handle body and further characterized by having said cushion formed of vulcanized rubber, and said supporting plate provided with spaced central projections vulcanized into the body of the cushion, and with marginal abutment projections adjacent to the slotted end of said cushion.

JOSEPH WHITE.